(No Model.) 2 Sheets—Sheet 1.
F. O. KINNEY.
COMBINED HARROW AND ROLLER.
No. 573,984. Patented Dec. 29, 1896.
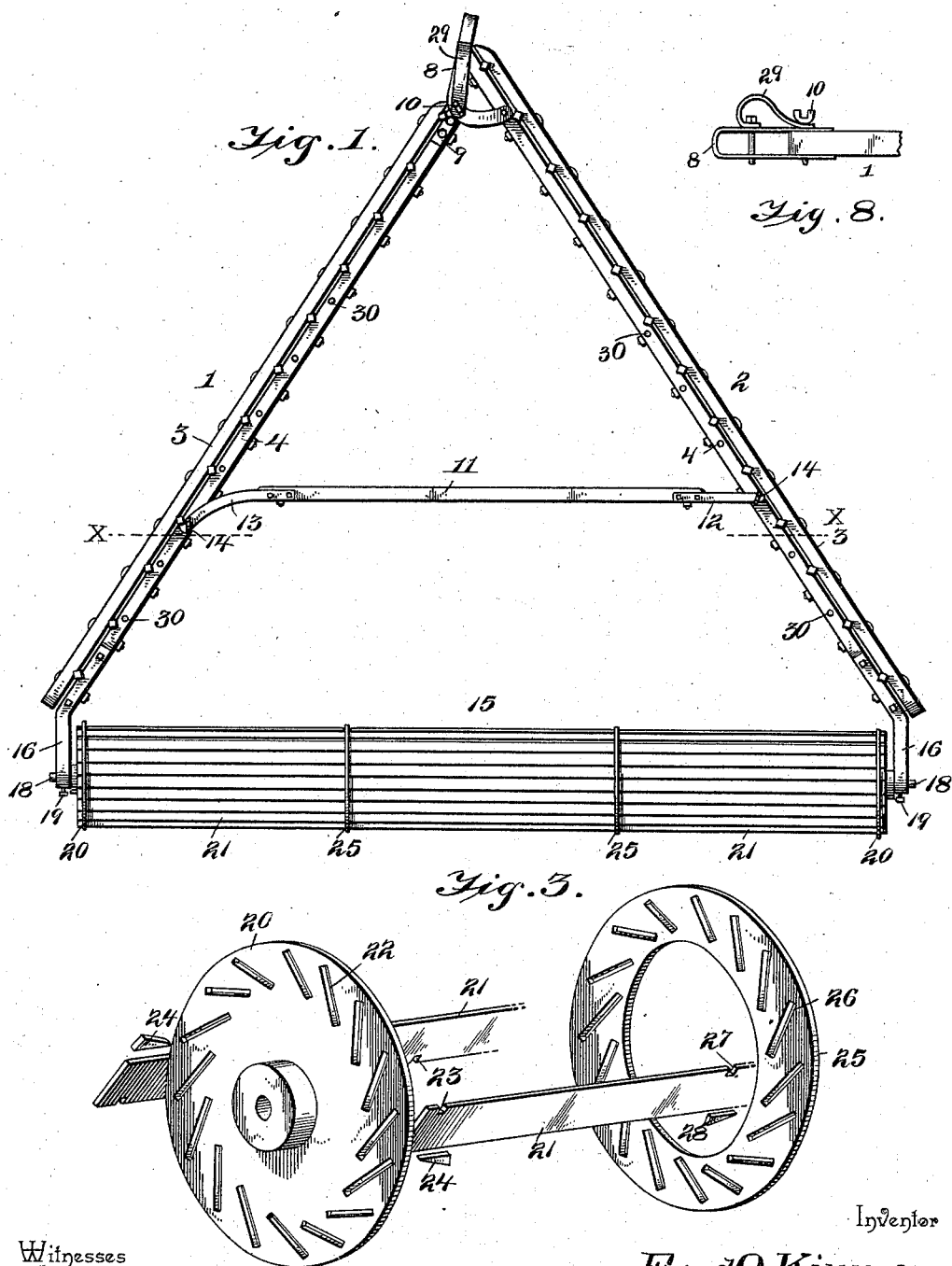
Witnesses
Thos. W. Riley
V. B. Hillyard
Inventor
Fred O. Kinney.
By his Attorneys,
C. A. Snow & Co.

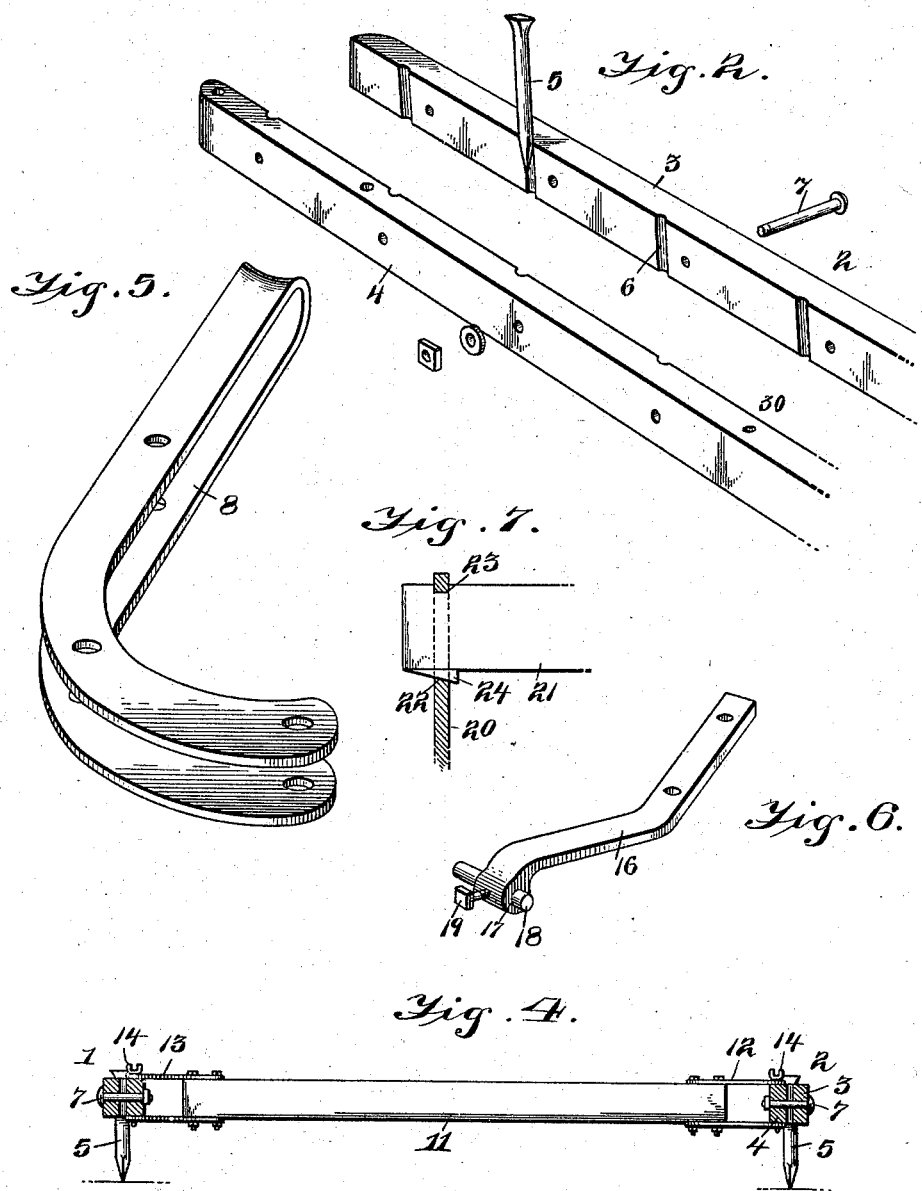

UNITED STATES PATENT OFFICE.

FRED OLIVER KINNEY, OF EGYPT, ARKANSAS.

COMBINED HARROW AND ROLLER.

SPECIFICATION forming part of Letters Patent No. 573,984, dated December 29, 1896.

Application filed February 20, 1896. Serial No. 580,025. (No model.)

*To all whom it may concern:*

Be it known that I, FRED OLIVER KINNEY, a citizen of the United States, residing at Egypt, in the county of Lawrence and State of Arkansas, have invented a new and useful Combined Harrow and Roller, of which the following is a specification.

This invention relates to agricultural implements for cultivating and tilling the soil, and has for its object to provide an improved harrow of novel construction and to combine therewith a pulverizer or roller which will perform the work for which it is designed in an effective and thorough manner, the implement being so constructed that it can be quickly reduced to a compact form to be readily moved from place to place either by snaking or in any convenient way, or to be stored.

The device is adjustable, so that it can be used in a variety of ways according to the character of the ground, whether stony, hilly, wet, covered with stubble, or other condition, or as required by the farmer.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of the complete implement. Fig. 2 is a detail view showing the manner of constructing the toothed bars. Fig. 3 is a detail view of a portion of the pulverizer, showing the manner of its formation. Fig. 4 is a transverse section on the line X X of Fig. 1, looking in the direction of the arrow. Fig. 5 is a detail view of the clevis. Fig. 6 is a detail view of one of the irons by means of which connection is had between the pulverizer and the frame-bars. Fig. 7 is a sectional detail showing the manner of connecting the slats with the heads and rings of the pulverizer. Fig. 8 is a detail view of the main and supplemental clevises.

Corresponding and like parts will be designated and referred to in the following description and all the figures of the accompanying drawings by similar reference-characters.

The frame or toothed bars 1 and 2 are similarly formed, and each comprises parallel members 3 and 4, between which are formed the openings for receiving the teeth 5, the latter being of ordinary construction, and the openings extending part way into the opposing or adjacent sides of the said members and appearing as grooves or channels 6, which, when the said members are placed together, provide passages for the reception of the teeth. These openings are provided in any convenient way, either by grooving the inner or adjacent sides of the parallel members or by boring openings along the line of juncture after the parts or members have been assembled. The teeth will be spaced a required distance apart and will incline slightly toward the rear, and to attain this end the openings or grooves will be given a slight inclination in this direction.

The bar 2 is slightly longer than the bar 1, thereby admitting of its front end projecting slightly in advance of the front end of the bar 1. The parallel members or parts entering into the formation of each frame-bar will be secured together by bolts 7, the latter being supplied in sufficient number so that one will come between each two of the teeth, and the bolts will be located adjacent to the teeth so as to clamp them firmly between the constituent parts of the bars.

The clevis 8 is elbow-shaped and is constructed of a strip of metal folded upon itself and having its end portions deflected, and this clevis is secured to the frame-bar 1 at the elbow and to the bar 2 at the extremity of its short arm, the parts of the clevis being separated sufficiently to receive the bars 1 and 2 between them. The connection between the clevis and the frame-bars is pivotal, thereby making provision for the adjustment of the frame-bars toward or from each other. Strap-irons 9 are let into the top and bottom sides of the bar 1 and are firmly secured thereto, and extend between the members of the clevis 8 and receive the pivot or wrench bolt 10, by means of which the said clevis and bar 1 are connected.

The frame-bars normally diverge and are strengthened and maintained at the required distance apart by means of a transverse brace 11, which is supplied at one end with strap-irons 12, which have pivotal connection with the bar 2, and at its opposite end with strap-irons 13, which are pivotally secured to the bar 1, the strap-irons 12 being straight and the strap-irons 13 having their projecting portion curved rearwardly, so as to admit of the folding of the brace 11 against the bar 1 when it is required to reduce the size of the implement for any required purpose, it being understood that the bar 2 must be previously disconnected from the strap-irons 12. The peculiar construction of the clevis 8 and the manner of connecting it with the frame-bars admit of the latter being folded when required. Any ordinary means may be had recourse to for pivotally connecting the brace 11 with the frame-bars, but, as shown, wrench-bolts 14, similar in construction to the wrench-bolt 10, are employed.

The pulverizing-roller 15 is journaled at its ends to irons 16, which are secured to the rear ends of the frame-bars, said irons having their rear portions bent so as to cause them to extend in parallel relation and terminating in horizontal eyes 17, which receive the journals 18 of the roller, and which journals are adjustably secured in the eyes 17 by means of clamp or binding screws 19, the latter being mounted in threaded openings communicating with the horizontal eyes, as will be readily understood.

The pulverizing-roller comprises circular heads 20 and a series of slats 21, the latter having a substantial connection at their ends with the said heads, preferably by having the end portions of the slats entering mortises or openings 22 near the peripheral edge of the heads and obliquely disposed to radii thereof. By this disposition of the mortises or openings the slats are tangentially arranged, and their flat sides will come in contact with the earth, so as to crush and break up the clods and the better pulverize and level the land. The slats 21 may be of any suitable material and are preferably steel bars comparatively thin and wide, but yet sufficiently stout to withstand the strain to which the roller will be subjected, and these slats have notches 23 in their outer edges close to their ends to receive the outer closed ends of the mortises or openings 22 by giving to the slats a sidewise movement after their end portions have been passed through the openings 22 and the notches brought in register with the heads. Keys or wedges 24 are forced into the mortises or openings 22 behind the rear edges of the slats, so as to hold the notches 23 in engagement with the heads and thereby secure the parts in a firm manner after being properly assembled. In the event of the slats being of any great length they are strengthened and braced intermediate of their ends by a ring 25, which is provided with openings 26, corresponding in position and number to the openings 22 and through which the slats pass, said slats having notches 27 to receive the outer closed ends of the openings 26 when the slats are moved outward, and keys 28 are forced into the openings 26 in the rear of the slats for the same purpose as the keys 24. It will be understood that there may be as many of these rings 25 as required to secure the requisite strength, and they will be properly positioned between the heads 20. The heads have centrally-disposed bosses forming, in effect, hub portions, which receive the journals 18 and upon which the roller rotates as the implement is drawn over the field.

In some instances it is necessary to change the point of attachment of the draft, and to effect this end a supplemental clevis 29 is had recourse to and is applied to the front end portion of the clevis 8. Hence the team can be hitched either to the clevis 8 or to the clevis 29, as required.

The angle inclosed between the frame-bars can be varied to suit the spread of the implement, and in order to hold the bars in the located position they are provided with a series of openings 30 to receive the pivots or fastenings 14, by means of which the transverse brace 11 is adjustably connected with the said frame-bars. This adjustment also admits of pulverizing-rollers of different length being employed and coupled to the implement.

The implement may be drawn over the field in any direction to attain the required pitch of the teeth, and the draft may be applied to the front end or to the rear end, as desired.

The inclination of the teeth 5 is changed by removing the teeth and inverting the bars and replacing the teeth. By this means either a scratching or a smoothing harrow may be had.

Having thus described the invention, what is claimed as new is—

1. In an agricultural implement, the combination of frame or toothed bars diverging from their front ends and having one bar projecting in advance of the end of the other bar, and an elbow-shaped clevis having pivotal connection at the elbow with the rearmost bar and having pivotal connection with the other bar a short distance in the rear of its front end and formed from a strip folded upon itself and having its end portions deflected, the parts of the clevis being separated and receiving the front ends of the toothed bars between them, substantially as shown for the purpose described.

2. In an agricultural implement, the combination of frame or toothed bars diverging at their rear ends, an elbow-shaped clevis having the end portions of its short arm pivotally connected to the front ends of the respective bars, and a transverse brace pivotally and adjustably connected to the said frame-bars to hold them at the required distance apart and having parallel strap-irons at its ends between which are received the toothed bars, one set of irons being straight and the other set curved, substantially as set forth.

3. In an agricultural implement, a pulverizing-roller comprising heads having closed slots or mortises around and contiguous to their peripheral edges, slats fitted into the said mortises and having notches in their edges to receive the closed ends thereof, and fastening means interposed between the rear edges of the slats and the adjacent closed ends of the mortises, substantially in the manner and for the purpose set forth.

4. In an agricultural implement, the combination of circular heads having openings around and contiguous to their peripheral edges and inclining or obliquely disposed to radii of the said heads, a ring having openings corresponding in position, number and form to the openings in the said heads, and slats having notches in their outer edges and fitted in the openings of the heads and ring and engaged positively therewith by having the said notches receiving the outer closed ends of the openings in the said heads and ring, substantially as specified.

In testimony that I claim the foregoing as my own I have hereto affixed my signature in the presence of two witnesses.

FRED OLIVER KINNEY.

Witnesses:
W. A. BRAMLETT,
J. C. HAWKINS.